(12) United States Patent
Miyata et al.

(10) Patent No.: US 12,115,884 B2
(45) Date of Patent: Oct. 15, 2024

(54) ELECTRIC POWER SUPPLY SYSTEMS AND POWER SUPPLY EQUIPMENT FOR ELECTRIC VEHICLE

(71) Applicant: Hitachi Industrial Products, Ltd., Tokyo (JP)

(72) Inventors: Hiroaki Miyata, Tokyo (JP); Kazuhiro Imaie, Tokyo (JP); Junichi Yanagita, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 18/026,616

(22) PCT Filed: Oct. 19, 2021

(86) PCT No.: PCT/JP2021/038666
§ 371 (c)(1),
(2) Date: Mar. 16, 2023

(87) PCT Pub. No.: WO2022/091886
PCT Pub. Date: May 5, 2022

(65) Prior Publication Data
US 2023/0331093 A1    Oct. 19, 2023

(30) Foreign Application Priority Data

Oct. 28, 2020   (JP) .................................. 2020-180615

(51) Int. Cl.
*B60L 9/00* (2019.01)
*B60L 7/10* (2006.01)
(Continued)

(52) U.S. Cl.
CPC .................. *B60L 9/00* (2013.01); *B60L 7/10* (2013.01); *B60M 3/00* (2013.01); *H02J 3/007* (2020.01)

(58) Field of Classification Search
CPC .............. B60L 9/00; B60L 7/10; H02J 3/007; B60M 3/00
See application file for complete search history.

(56) References Cited

U.S. PATENT DOCUMENTS

2013/0043721 A1*  2/2013  Peitzke .................... F03G 7/00
                                                                 307/9.1
2014/0095006 A1   4/2014  Saito et al.

FOREIGN PATENT DOCUMENTS

| JP | 48-93011 A | 12/1973 |
| JP | 6-284514 A | 10/1994 |
| JP | 2013-17315 A | 1/2013 |

OTHER PUBLICATIONS

International Search Report (PCT/ISA/210) issued in PCT Application No. PCT/JP2021/038666 dated Nov. 22, 2021 with English translation (four (4) pages).

(Continued)

*Primary Examiner* — Carlos Amaya
(74) *Attorney, Agent, or Firm* — Crowell & Moring LLP

(57) ABSTRACT

A power supply system for electric vehicle comprising; power; a first power line; and a second power line; wherein the output of the high voltage side from the power line is fed to the high voltage side of each of the first power line and the second power line, the output of the low voltage side from the power line is fed to the low voltage said of each of the first power line and the second power line, the first power line and the second power line are connected at their far ends and a power supply system for electric vehicle that supplies electric power to an electric vehicle by means of said first power line or said second power line. the first power line and the second power line have a bypass line that interconnects from the power to the connection at the far end.

8 Claims, 4 Drawing Sheets

(51) Int. Cl.
*B60M 3/00* (2006.01)
*H02J 3/00* (2006.01)

(56) References Cited

OTHER PUBLICATIONS

Japanese-language Written Opinion (PCT/ISA/237) issued in PCT Application No. PCT/JP2021/038666 dated Nov. 22, 2021 (three (3) pages).

* cited by examiner

ELECTRIC POWER SUPPLY SYSTEMS AND POWER SUPPLY EQUIPMENT FOR ELECTRIC VEHICLE

TECHNICAL FIELD

This invention relates to power supply systems and power supply facilities for electric vehicle.

BACKGROUND ART

Transportation methods in which power is supplied from an overhead power line to drive a powered vehicle are now widely used. The main applications have been electric vehicle, trams, and trolleybuses, but recently, as disclosed in Patent Document 1, dump trucks are also being used.

CITATION LIST

Patent Document

Patent Document 1 JP 2013-17315 A

SUMMARY OF THE INVENTION

Problems to be Solved by the Invention

Electric vehicle powered by overhead power lines, except for loop lines, are operated separately for each return trip. In this case, when operated on a flat line, it is difficult to cause an imbalance in power consumption between the power electric vehicle on the upstream side and the downstream side. However, when the electric vehicle are operated mainly in areas with continuous gradients in one direction, such as mountainous areas or slopes of open-pit mines, the uphill side consumes power to drive the electric vehicle motor, while the downhill side descends under its own weight without consuming power, or rather generates power by regenerative braking, etc., and the uphill side consumes power to drive the electric vehicle motor. Even if the same amount of power is supplied to both sides, the upstream side will have insufficient power and the downstream side will have excessive power.

The purpose of this invention is to improve such issues described above and to provide a means to make electric vehicle power more efficient in gradient regions.

Solutions to Problems

One preferred example of the invention has a power supply system for electric vehicle comprising; power; a first power line; and a second power line; wherein the output of the high voltage side from the power line is fed to the high voltage side of each of the first power line and the second power line, the output of the low voltage side from the power line is fed to the low voltage side of each of the first power line and the second power line, the first power line and the second power line are connected at their far ends and
  a power supply system for electric vehicle that supplies electric power to an electric vehicle by means of said first power line or said second power line. the first power line and the second power line have a bypass line that interconnects from the power to the connection at the far end.

Effects of the Invention

According to this invention, the power of electric vehicle in gradient areas can be highly efficient.

Further effects of the present invention will become apparent throughout the following description.

MODE FOR CARRYING OUT THE INVENTION

The drawings will be used to illustrate examples of the invention.

Example 1

Figure 3:
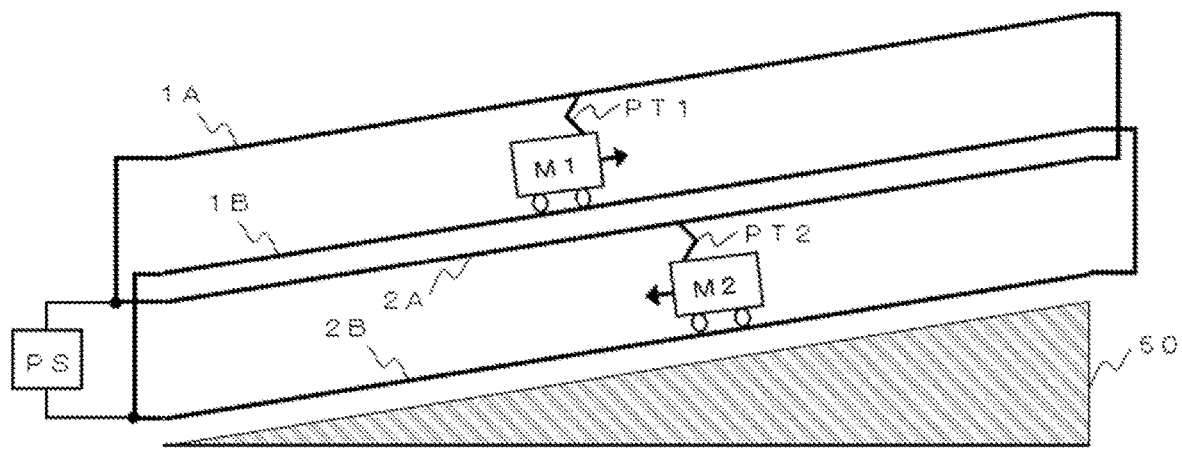
FIG. 3 illustrates a comparative example.

FIG. 3 illustrates a comparative example in which electric vehicle is operated up and down in a gradient area. 50 indicates the gradient; PS is power, including the case where power is supplied from an external system; the high-voltage power line connected to the power PS splits into a high-voltage power line on the upstream side 1A and a high-voltage power line on the downstream side 2A, which are reconnected at the far end. The high-voltage power line connected to power PS splits into a high-voltage power line on the upstream side 1A and a high-voltage power line on the downstream side 2A, which are again interconnected at the far end. Similarly, the low-voltage power line connected to the power PS splits into a Low-voltage power line on the upstream side 1B and a Low-voltage power line on the downstream side 2B, which are again interconnected at the far end. The power lines are connected to each other again at the far end.

M1 is the upstream electric vehicle. Power from the high-voltage power line on the upstream side 1A is introduced through the high-voltage input of the electric vehicle via the pantograph PT1 to drive the motor directly or indirectly. Line M1 has a low-voltage input corresponding to the high-voltage input and is connected to the low-voltage power line on the upstream side 1B. FIG. 3 shows an example of a connection to the metal rail that makes up the Low-voltage power line on the upstream side 1B via a metal wheel.

M2 is the downstream electric vehicle. Power from the high-voltage power line on the downstream side 2A is introduced through the high-voltage input of the electric vehicle via the pantograph PT2 to drive the motor directly or indirectly. down line M2 has a low-voltage input corresponding to the high-voltage input and is connected to the low-voltage power line on the downstream side 2B. FIG. 3 shows an example of the connection to the metal rails that make up the Low-voltage power line on the downstream side 2B via metal wheels.

The above description includes both cases where power PS supplies direct current and where it supplies alternating current.

Pantograph PT1 and pantograph PT2 are not limited to pantographs, but also trolley poles, as long as the power feeding function can be realized.

Since electric vehicle on the up line M1 is an up line, the motor is driven up while consuming power supplied by the power line. On the other hand, since electric vehicle on the down line M2 is a down line, it is desirable to provide a power-generating brake, such as a speed reducing brake or a power regenerative brake, to reduce the downward speed of the down line. In this case, the motor of electric vehicle on the down line M2 functions as a generator, and the generated power is rather returned to the power line. Thus, electric vehicle on the up line M1 consumes power and electric vehicle on the down line M2 supplies power. Therefore, the power consumption of the power electric vehicle on the up line and the down line is the exact opposite.

Figure 4:
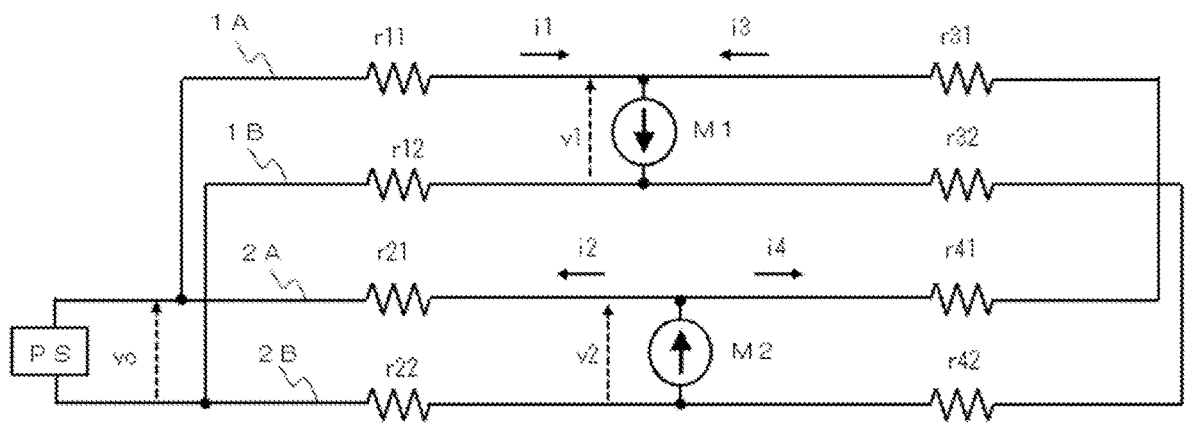
FIG. 4 shows the schematic equivalent circuit of a comparative example.

The power situation in this case is explained in FIG. 4, which is a schematic equivalent circuit diagram of FIG. 3.

In the following explanation, the same symbols as in FIG. 3, including other figures, have the same functions and are omitted from the explanation.

Each subscripted r in FIG. 4 indicates the power line resistance at each power line.

$v0$ is the voltage value near power PS, $v1$ is the voltage value at electric vehicle on the up line M1 on the upstream side, and $v2$ is the voltage value at electric vehicle on the down line M2 on the downstream side. The flow of power is as shown in $i1$ and $i3$, and is directed from the high-voltage power line on the upstream side 1A to electric vehicle on the up line M1. Conversely, electric vehicle on the down line M2 are generated by regenerative braking, for example, and the power flow is $i2$ and $i4$, which flow from electric vehicle on the up line M1 to High-voltage power line on the downstream side 2A. The direction of the power flow will be as follows.

The state of power at this time is as follows: (1) Power consumption by electric vehicle on the up line M1 decreases the energy of the entire system of the power line.

(2) The decrease in the overall energy of the power line system acts on the side of the decrease in power line voltage. Power regeneration by electric vehicle on the down line M2 increases the overall energy of the power line system.

(3) At this time, power PS adjusts the power to be passed through the power line as well as the power supply to the power line, and adjusts the energy of the entire power line system to maintain the power line voltage constant.

(4) However, apart from the above events caused by the increase or decrease of energy in the entire system, the current flowing toward electric vehicle on the up line M1 and the voltage drop on the power line due to the current cause the power line voltage $v1$ at the position of electric vehicle on the up line M1 to be lower than the power voltage $v0$.

Equivalent circuit is expressed $v1=v0-i1\times(r11+r12)<v0$.

(5) Similarly, the current flowing from electric vehicle on the down line M2 and the voltage drop on the power line due to the current causes the power line voltage $v2$ at the position of electric vehicle on the down line M2 to be higher than the power voltage.

Equivalent circuit is expressed $v2=v0-i2\times(r21+r22)>v0$.

This causes the following problems (A) If the power line voltage $v1$ decreases at electric vehicle on the up line M1, the energy that can be used by electric vehicle on the up line M1 to maintain speed, accelerate, etc. is reduced, resulting in the problem of reduced acceleration and, consequently, reduced speed. This causes the problem of reduced acceleration and, consequently, reduced speed.

(B) If the power line voltage increases at electric vehicle on the down line M2 due to the power supply from electric vehicle on the down line M2 to the power line, the voltage withstand capacity of electric vehicle on the down line M2 may be exceeded. Another option is to pre-drop the voltage from the power PS to the power line to avoid this, but this would cause another problem by reducing the driving power of the electric vehicle on the up line M1.

Figure 5:
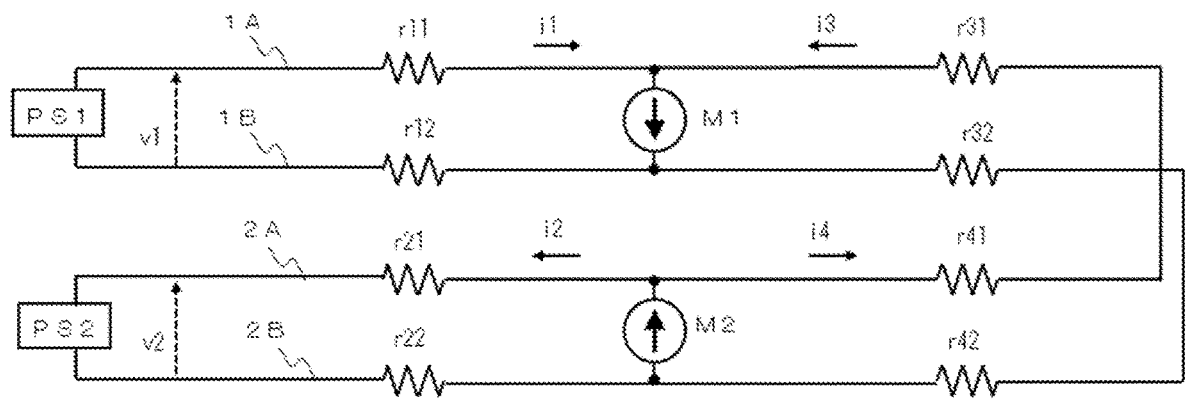
FIG. 5 shows the schematic equivalent circuit of the reference example.

(C) As a reference example, as shown in FIG. 5, while there is only one power PS in FIG. 3, it is possible to divide the power PS into the first power PS1 for the uplink line and the second power PS2 for the downlink line, and set the voltage of the first power PS1 higher and the second power PS2 lower. The voltage of the first power PS1 is high and the voltage of the second power PS2 is low. In this case, however, the cost of the power PS would simply double in this case as well. Also, with mutually different voltages, the current suppression between the high-voltage power line on the upstream side 1A and the high-voltage power line on the downstream side 2A, which are connected at the ends, will be a new challenge. The new challenge will be the current suppression between the high-voltage power line on the upstream side 1A and the high-voltage power line on the downstream side 2A.

Therefore, the present invention features bypass wiring, which connects the high-voltage side of the line on the upstream side and the low-voltage side of the line on the downstream side until they are reconnected to each other at the end (far end) from the branch on the power PS side.

Figure 1:
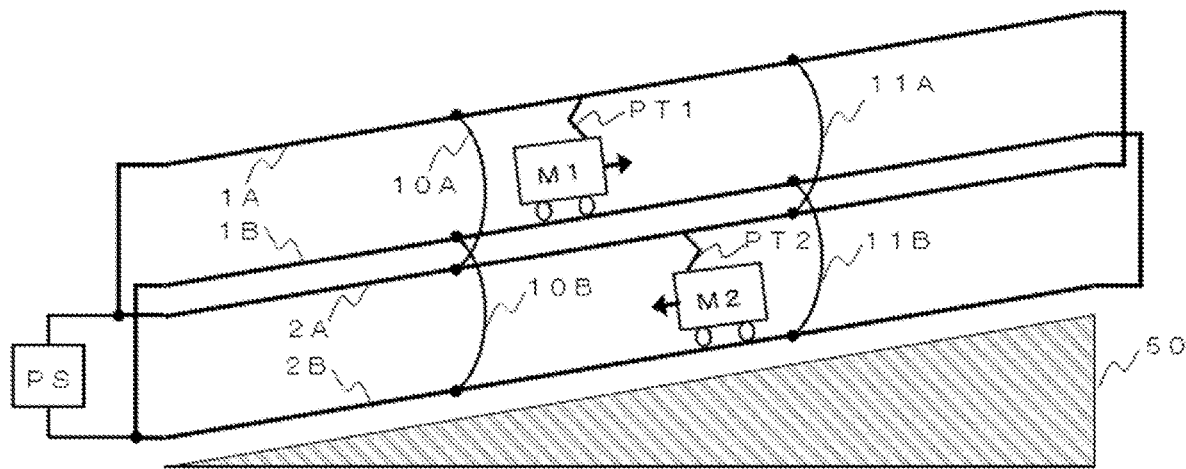
FIG. 1 illustrates Example 1.

FIG. 1 illustrates this example, a power supply system for electric vehicle. Difference between FIG. 3 are the following: High-voltage power line on the upstream side 1A and high-voltage power line on the downstream side 2A are electrically connected by high voltage side bypass wiring 10A, High voltage side bypass wiring 11A.

Low-voltage power line on the upstream side 1B and low-voltage power line on the downstream side 2B are electrically connected by low-voltage side bypass wiring 10B, low-voltage side bypass wiring 11B.

In other words, by electrically connecting the power lines of multiple electric vehicle tracks and making some of the power lines parallel circuits, the impedance can be lowered and the voltage drop on the power lines between power PS and electric vehicle on the up line M1 can be reduced. This results in a smaller voltage drop on the power line between power PS and electric vehicle on the up line M1. As a result, the voltage drop on the power line due to electric vehicle on the up line M1 and the voltage rise on the power line due to electric vehicle on the down line M2 can be suppressed.

In other words, the voltage drop caused by electric vehicle on the up line M1 can be compensated by the voltage increase caused by electric vehicle on the down line M2 in a short distance. Since the voltage drop due to electric vehicle on the up line M1 is compensated in a short distance, the influence of the power line resistance is less than in the comparative example without the bypass line, and the effect of the compensation can be improved.

This effect is due to the direct exchange of power between electric vehicle via the electrical connection between the power lines of multiple electric vehicle, i.e., the power regenerated from the braking or braking electric vehicle is consumed by the power electric vehicle, which reduces the current flowing in the power lines between power and the connection point between the power lines and reduces the voltage drop on the power lines between power and electric vehicle.

As a result, it is possible to suppress the power line voltage drop in a power electric vehicle and the power line voltage rise in a braking or braking electric vehicle.

FIG. 1 shows an example of two bypass lines each on the high-voltage and low-voltage sides, but does not exclude the case of one bypass line.

In FIG. 1, two bypass lines are shown for the high-voltage side and the low-voltage side, but this does not preclude the use of three or more bypass lines, which should be designed according to the extension length of the power lines.

In FIG. 1, the same number of bypass lines are illustrated for the high-voltage and low-voltage sides, but if the low-voltage side has a stable potential environment, the number of bypass lines on the low-voltage side may be less than that on the high-voltage side.

The invention also includes an example where the bypass line is only provided on the high voltage side, depending on the stability of the low voltage side.

In FIG. 1, there is one electric vehicle each for the up and down lines, but there can be multiple electric vehicle each, or even an unbalanced number of electric vehicle on the up and down lines. The more such actual use is taken into consideration, the more important and superior the invention becomes.

Figure 6:
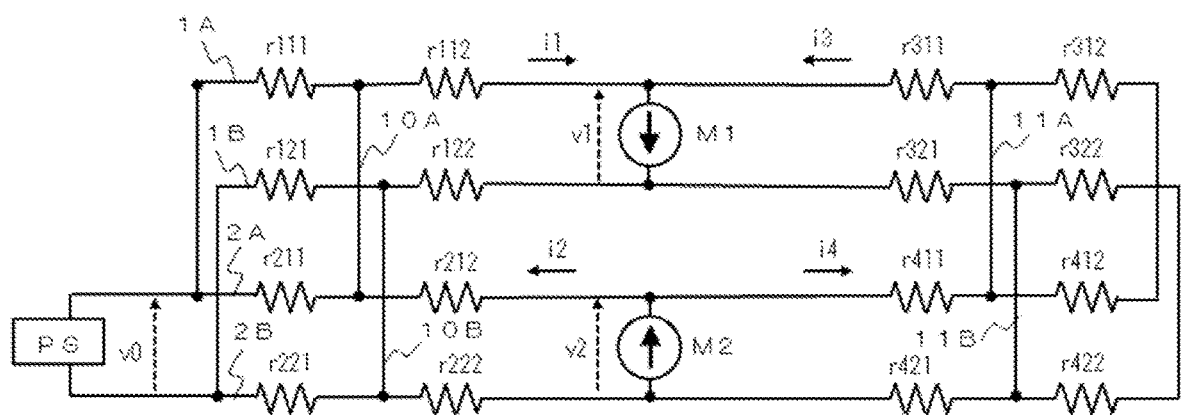
FIG. 6 shows the schematic equivalent circuit of Example 1.

FIG. 6 is a schematic equivalent circuit diagram for the case of FIG. 1. It is corresponding to the FIG. 4 in case of FIG. 3.

Figure 7:
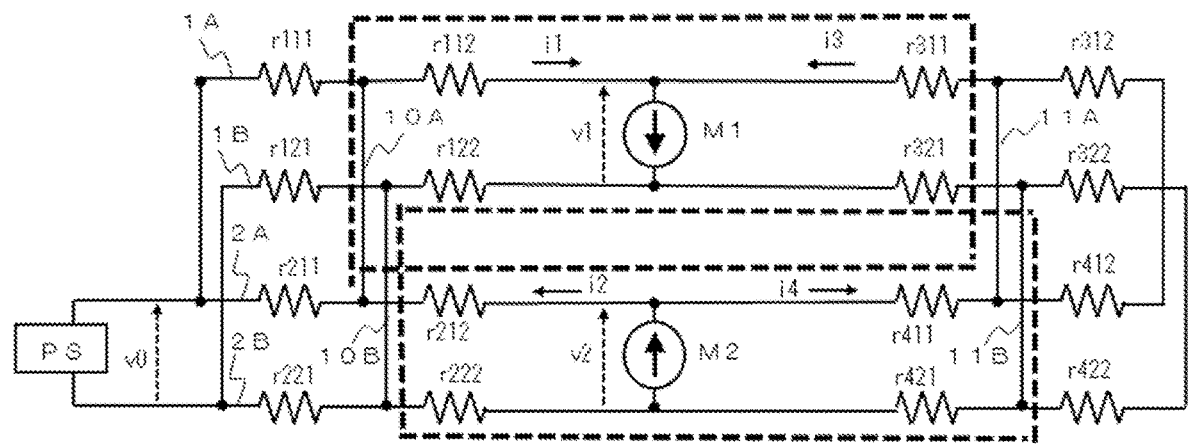
FIG. 7 illustrates the schematic equivalent circuit diagram of Example 1.

FIG. 7 illustrates the exchange of power through the bypass line between electric vehicle on the up line M1 and electric vehicle on the down line M2 when a bypass line is provided in FIG. 6. The thick dashed line in the figure shows the exchange of power: regenerative power generated by electric vehicle on the down line M2 is supplied to electric vehicle on the up line M1 by means of a bypass line connecting the power lines on the high-voltage side. The same is true on the low voltage side.

Figure 8:
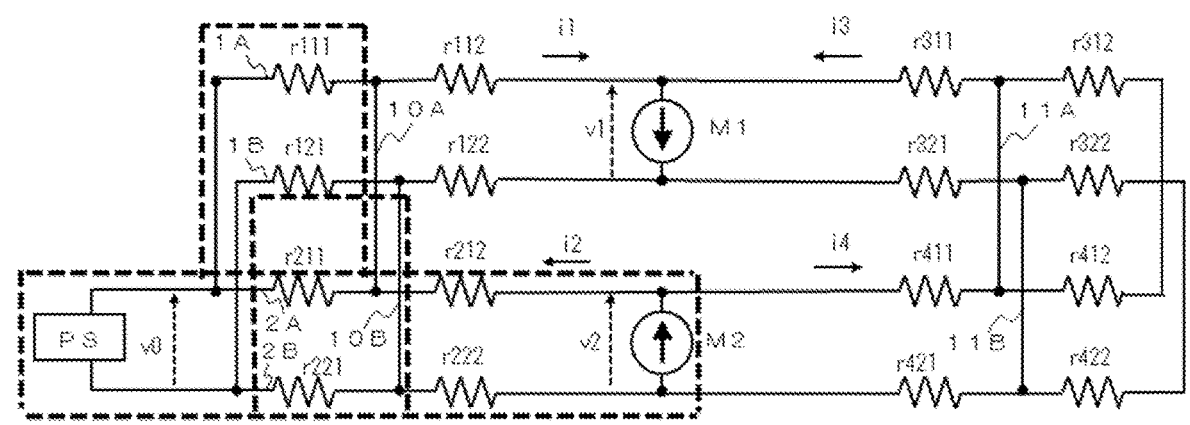
FIG. 8 is another illustration of the schematic equivalent circuit diagram of Example 1.

FIG. 8 illustrates another power flow through the bypass line in FIG. 6, showing a route where regenerative power from electric vehicle on the down line M2 is also consumed by the power line resistors on the up line before returning to power PS. It can be understood that the effect of paralleliza-tion by the bypass line can be achieved even in situations where the number of electric vehicle on the up line M1 is less than the number of electric vehicle on the down line M2, or where electric vehicle on the up line M1 is temporarily absent.

When power PS is AC, the notation of the high-voltage side and the low-voltage side will be interchanged according to the phase of the AC, so the configuration of the high-voltage side and the low-voltage side in FIG. 1 should be close to the same.

According to this example, the power of electric vehicle in a gradient region can be highly efficient.

Example 2

Figure 2:
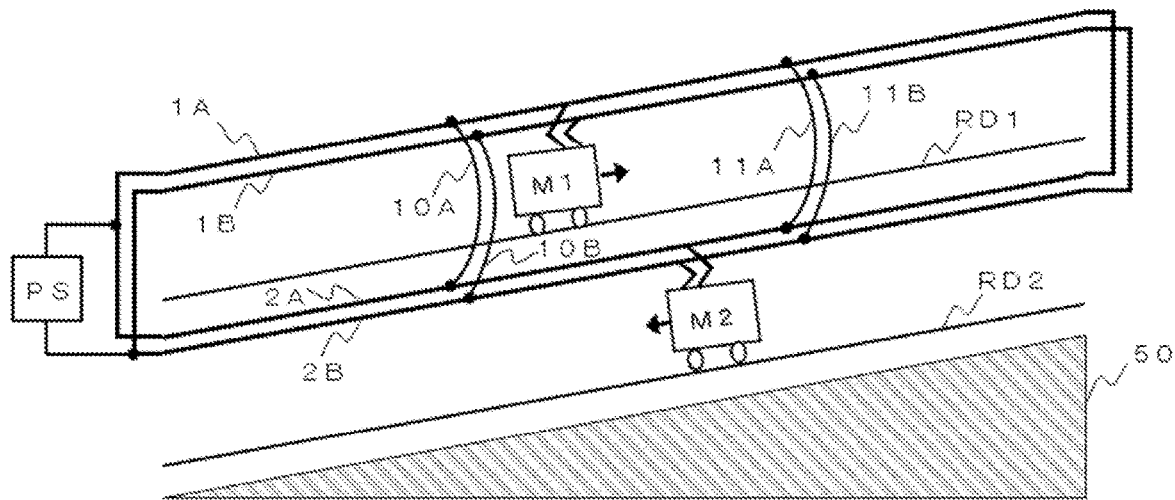
FIG. 2 illustrates Example 2.

FIG. 2 illustrates Example 2, a power supply system for electric vehicle. The difference from FIG. 1 is that the low-voltage power line on the upstream side 1B and the low-voltage power line on the downstream side 2B are configured as overhead power lines instead of rails. 2 denote the road surface. In FIG. 2, power from the high-voltage power line on the upstream side 1A is fed through the first conducting pole to electric vehicle on the up line M1, and then through the second conducting pole to low-voltage power line on the upstream side 1B via the second conduct-ing pole. Similarly, power from the high-voltage power line on the downstream side 2A is fed through another first conducting pole to electric vehicle on the down line M2 and through another second conducting pole to low-voltage power line on the downstream side 2B.

This example is suitable for applications such as electric trucks. If the slope is steep and the wheels are equipped with non-metallic wheels, such as those for rubber tire drive, the configuration shown in FIG. 2 would be used instead of FIG. 1. However, the equivalent circuit is the same in FIG. 2 as in FIG. 1, and the various explanations and disclosed ideas in Example 1 are also directly applicable to Example 2.

When power PS is AC, the configuration in FIG. 2 allows the same conditions for the high-voltage side configuration and the low-voltage side configuration, so this configuration is particularly suitable when AC is supplied to the power line.

According to this example, in a electric vehicle power supply system where the low-voltage power line on the upstream side 1B and the low-voltage power line on the downstream side 2B are configured as overhead power lines instead of rails, the power supply for the electric vehicle can be highly efficient. In systems where the low-voltage power line on the upstream side 1B and the low-voltage power line on the downstream side 2B are configured as overhead power lines instead of rails, electric vehicle power can be highly efficient.

The above example is described as an electric power supply system for electric vehicle, but it can also be applied as an electric power supply facility.

REFERENCE SIGNS LIST

1A High-voltage power line on the upstream side
2A High-voltage power line on the downstream side
1B Low-voltage power line on the upstream side
2B Low-voltage power line on the downstream side
PT1, PT2 pantograph
M1 Electric vehicle on the up line
M2 Electric vehicle on the down line
10A, 11A High voltage side bypass wiring
10B, 11B Low-voltage side bypass wiring
50 gradient
PS Power supply

The invention claimed is:

1. A power supply system for electric vehicles, the power supply system comprising:
a power supply;
a first power line; and
a second power line;
wherein an output of a high voltage side from the power supply is fed to the high voltage side of each of the first power line and the second power line,
an output of a low voltage side from the power supply is fed to the low voltage side of each of the first power line and the second power line,
the first power line and the second power line are connected at their far ends,
the power supply system supplies electric power to the electric vehicles by means of said first power line or said second power line,
the first power line and the second power line have bypass lines that interconnect from the power supply to a connection at the far end, the second power line is disposed on an inclined region between the power supply and the connection, and a first electric vehicle traveling in the inclined region on a down line has a restraining brake or a regenerative brake that generates power when restraining a speed of the first electric vehicle, and the generated power is supplied through the bypass lines to a second electric vehicle traveling in the inclined region on an up line.

2. A power supply system for electric vehicle according to claim 1, wherein a number of the bypass lines is formed more on the high-voltage side than on the low-voltage side.

3. A power supply system for electric vehicle according to claim 1, wherein the power supply supplies AC power, the first power line and the second power line are formed as overhead lines, and a number of the bypass lines is equal on the low voltage side and the high voltage side.

4. The power supply system for electric vehicle according to claim 1, wherein the first power line is disposed on the inclined region between the power supply and the connection.

5. An electric power supply facility comprising:

a power supply;

a first power line; and a second power line;

wherein an output of a high voltage side from the power supply is fed to the high voltage side of each of the first power line and the second power line, an output of a low voltage side from the power supply is fed to the low voltage side of each of the first power line and the second power line, the first power line and the second power line are connected at their far ends; and a power supply facility that supplies electric power to electric vehicles by means of said first power line or said second power line, wherein the first power line and the second power line have bypass lines that interconnect from the power supply to a connection at the far end, the second power line is disposed on an inclined region between the power supply and the connection, and a first electric vehicle traveling in the inclined region on a down line has a restraining brake or a regenerative brake that generates power when restraining a speed of the first electric vehicle, and the generated power is supplied through the bypass lines to a second electric vehicle traveling in the inclined region on an up line.

6. The electric power supply facility according to claim 5, wherein a number of the bypass lines is more on the high-voltage side than on the low-voltage side.

7. The power supply facility according to claim 5, wherein the power supply supplies AC power, the first power line and the second power line are overhead lines, and a number of the bypass lines is equal on the low voltage side and the high voltage side.

8. The power supply facility according to claim 5, wherein the first power line is disposed on the inclined region between the power supply and the connection.

\* \* \* \* \*